(12) United States Patent
Pfau

(10) Patent No.: US 12,255,765 B1
(45) Date of Patent: Mar. 18, 2025

(54) SYSTEMS AND METHODS OF PROBABILISTIC CONSTELLATION SHAPING

(71) Applicant: Acacia Communications, Inc., Maynard, MA (US)

(72) Inventor: Timo Pfau, Somerville, MA (US)

( * ) Notice: Subject to any disclaimer, the term of this patent is extended or adjusted under 35 U.S.C. 154(b) by 70 days.

(21) Appl. No.: 17/687,071

(22) Filed: Mar. 4, 2022

Related U.S. Application Data

(60) Provisional application No. 63/157,614, filed on Mar. 5, 2021.

(51) Int. Cl.
*H04L 27/34* (2006.01)

(52) U.S. Cl.
CPC ...... *H04L 27/3416* (2013.01); *H04L 27/3411* (2013.01)

(58) Field of Classification Search
CPC .......................... H04L 27/3416; H04L 27/3411
See application file for complete search history.

(56) References Cited

U.S. PATENT DOCUMENTS

| | | | | |
|---|---|---|---|---|
| 10,670,692 B1* | 6/2020 | Marko | ............ | G01S 5/145 |
| 11,683,100 B2* | 6/2023 | Koss | ............ | H04L 7/042 |
| | | | | 398/190 |
| 2004/0179577 A1* | 9/2004 | Kim | ............ | H04B 1/7183 |
| | | | | 375/130 |
| 2011/0095740 A1* | 4/2011 | Mori | ............ | H02M 3/156 |
| | | | | 323/282 |
| 2011/0116568 A1* | 5/2011 | Oh | ............ | H04L 27/02 |
| | | | | 375/295 |
| 2012/0224852 A1* | 9/2012 | Liu | ............ | H04L 27/3483 |
| | | | | 398/189 |
| 2013/0064272 A1* | 3/2013 | Piechocki | ............ | H04L 25/49 |
| | | | | 375/295 |

FOREIGN PATENT DOCUMENTS

| | | | | |
|---|---|---|---|---|
| CA | 2993642 A1 * | 4/2017 | ............ | H04B 1/707 |
| FR | 2913161 A1 * | 8/2008 | ....... | H04L 25/03242 |

* cited by examiner

*Primary Examiner* — Freshteh N Aghdam
(74) *Attorney, Agent, or Firm* — K&L GATES LLP

(57) ABSTRACT

In part, the disclosure relates to a constellation shaping system that includes a plurality of encoders, wherein one or more of the plurality of encoders is associated with a priority level according to a configuration, wherein a pulse is allocated to a time slot, using an encoder based on priority level of the encoder.

19 Claims, 6 Drawing Sheets

US 12,255,765 B1

SYSTEMS AND METHODS OF PROBABILISTIC CONSTELLATION SHAPING

CROSS REFERENCE TO RELATED APPLICATIONS

This application claims priority to and the benefit of U.S. Provisional Patent Application No. 63/157,614 filed Mar. 5, 2021, the disclosure of which is herein incorporated by reference in its entirety.

BACKGROUND

Contemporary optical communications and other photonic systems make extensive use of photonic components that are advantageously mass-produced in various configurations for various purposes.

SUMMARY

In part, in one aspect, the disclosure relates to a constellation shaping system. The system may include a plurality of encoders, wherein one or more of the plurality of encoders is associated with a priority level according to a configuration, wherein a pulse is allocated to a time slot, using an encoder based on priority level of the encoder. In one embodiment, the plurality of encoders are configured to operate in parallel. In one embodiment, output time slot allocation information is provided to a second encoder from a first encoder, wherein the first encoder has a first priority level and the second encoder has a second priority level. In one embodiment, Q is cardinality of amplitude levels in base constellation. In one embodiment, one or more of the plurality of encoders is a binary encoder. In one embodiment, Q ranges from 2 to 12.

In one embodiment, the system may further include a distribution matcher that includes the plurality of encoders; a bit stream input; and a switch in communication with the bit stream input and plurality of encoders. In one embodiment, the switch allocates one or more bits from the input bit streams to different slots, wherein each slot is in communication with an encoder of the plurality of encoders. In one embodiment, the system may further include a bit mapping device, wherein the bit mapping device receives outputs from the plurality of encoders. In one embodiment, the system may further include a forward error correction encoder, the forward error correction encoder in communication with the bit mapping device.

In one embodiment, a mapping device, wherein the mapping device maps output signals from the forward error correction encoder according to a modulation scheme. In one embodiment, the modulation scheme is PAM or QAM. In one embodiment, the system may further include an inverse distribution matcher in communication with the distribution matcher. In one embodiment, the plurality of encoders are a plurality of multipulse pulse-position modulation (MPPM) encoders.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, optical paths, waveguides, encoders, decoders, logic, memory, splitters, couplers, combiners, electro-optical devices, inputs, outputs, ports, channels, components, and parts of the foregoing disclosed herein can be used with any laser, laser-based communication system, waveguide, fiber, transmitter, transceiver, receiver, and other devices and systems without limitation.

These and other features of the Applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Figure 1:
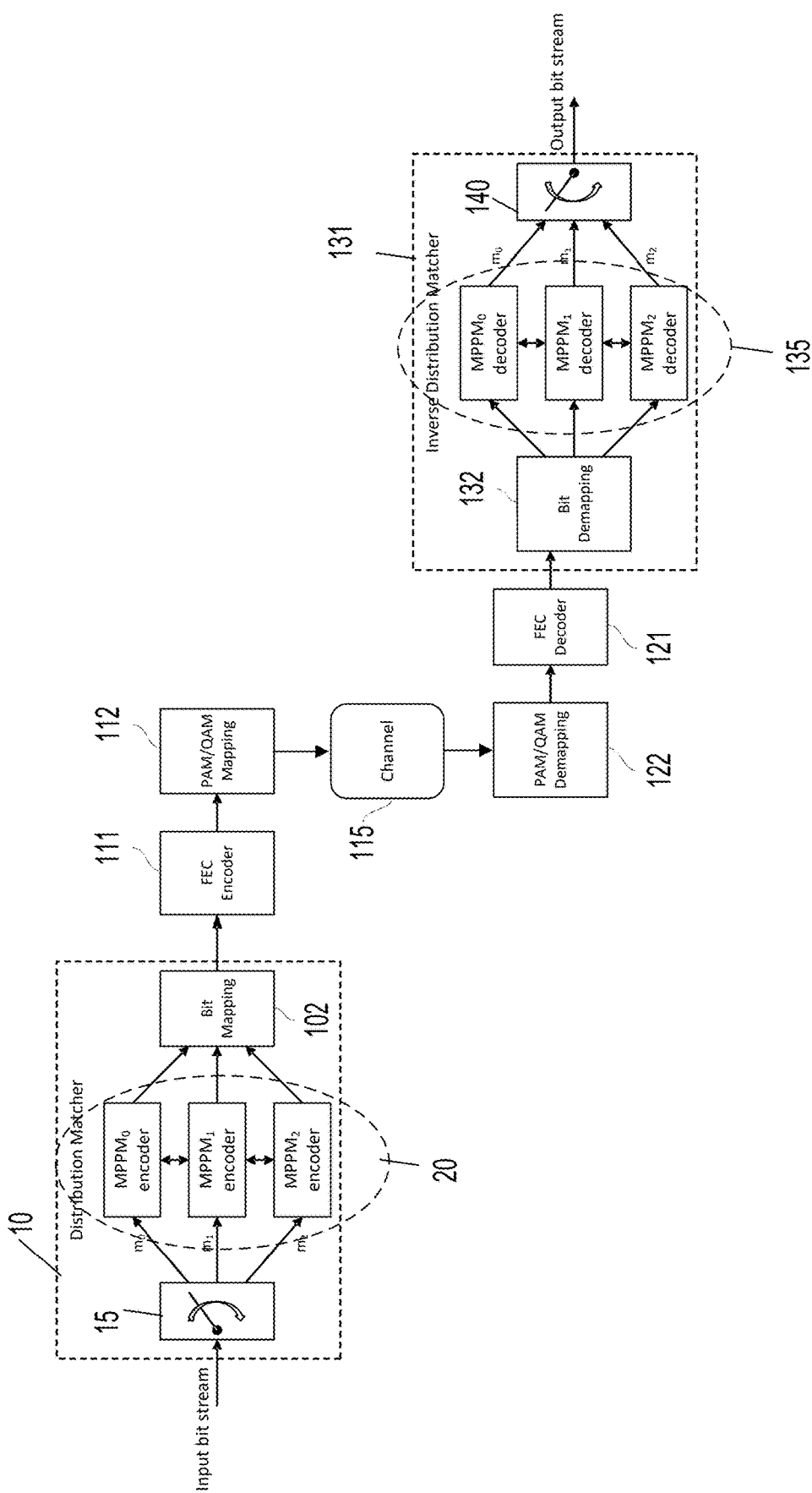
FIG. 1 is a block diagram of MPPM encoding, transmission, and decoding, in accordance with an embodiment of the disclosure.

Generally, coherent data transmission encodes data on a carrier signal. Usually, that carrier signal is modulated according to a specific format. Typically, a modulation format is described by an underlying constellation, which defines signal points in two dimensional space that are used to encode data. Conventional Quadrature Amplitude Modulation (QAM) systems use signal points with equal probabilities. Generally, for a conventional QAM constellation, input distribution is uniform and the transmitted QAM sequence has a histogram that looks like a cube.

In many embodiments, Applicant has realized that a bell-shaped Gaussian distribution may have a better power efficiency and may be optimal compared to typical QAM modulation formats, such as those that use points with equal probabilities. Conventionally, probabilistic constellation shaping (PCS) is a modulation format that may be an enabling technology for power-efficient and data rate flexible fiber-optic communication. In certain embodiments, Applicant has realized that PCS may be used to imitate a Gaussian distribution on signal points and may use signal points with lower power more frequently. In various embodiments, the systems and methods disclosed herein may be used for various modulation formats including without limitation 8-QAM, 16-QAM, 32-QAM, 64-QAM, 128-QAM, 256-QAM and others.

In some embodiments, a Gaussian type distribution of signal points may be realized by generating a non-uniform distribution using a distribution matching (DM) algorithm, system, or method. In certain embodiments, Applicant has realized that there may be a tradeoff with an implementation complexity of DM algorithms where algorithms that are more complex require more processing power perform better while less complex implementations tend to not perform as well but require less power. In other embodiments, Applicant has realized that recording all of a distribution mapping in memory may require large amounts of storage. As a results, in some embodiments one or more processes or system components or features are operable to reduce or manage storage and stored data.

In some embodiments, pulse-position modulation (PPM) may be a form of signal modulation in which blocks of n time slots contains one "1" and n-1 "0's." In certain embodiments, information may be encoded by letting each group of log 2{n} bits designate which of the n slots contains the "1." In many embodiments, multipulse PPM (MPPM) may extend PPM by allowing more than one pulse per block. In some embodiments, in n-slot k-pulse MPPM, there may be nchoosek(n, k) unique symbols, corresponding to the possible ways to populate n slots with k pulses. In many embodiments, an additional generalization may be possible by not having a fixed number of pulses per block, but a maximum number of pulses $k_{min} \leq k \leq k_{max}$, which may be referred to herein as Flex-MPPM. In most embodiments, Flex-MPPM modulation may increase a number of bits that may be encoded within each block while at the same time reducing the average number of pulses per block.

Refer now to the exemplary embodiment of FIG. 1, wherein a high-level block diagram of an MPPM-based encoding, transmission, and decoding system is illustrated. An input bit stream is received by a distribution matcher 10 that includes a switching device 15 and an array of MPPM encoders 20 which create a new bit mapping 102. In various embodiments, each MPPM encoder processes a different number of bits per block. The switch provides the appropriate amount of bits to each MPPM encoder in a distribution sequence such as in a round robin fashion. Various encoders including but not limited to MPPM encoders may be used in the encoder array 20. In some embodiments, the encoder array 20 includes a plurality of encoders. As shown, the encoders are MPPM encoders labeled as $MPPM_0$, $MPPM_1$, and $MPPM_2$. A forward error correction (FEC) module or encoder 111 may add redundancy or parity bits to a bit stream transmitted from a bit mapper or bit mapping device 102. In various embodiments, a bit stream is mapped 112 into a pulse amplitude modulation (PAM) signal, a quadrature amplitude modulation (QAM) signal, or another modulated signal-encoding format using a mapper or mapping device such as a QAM/PAM mapping device 112 before transmission over a communications channel 115. In various embodiments, the communications channel 115 is an optical fiber communications channel. The communications channel may be a short or long haul channel.

In some embodiments, a similar decoding process occurs at a receiver or transceiver, wherein a signal is demodulated using a demapper or demapping device such as PAM/QAM demapping device or module 122 and stripped of parity or redundancy bits using a decoder such as a FEC decoder 121. The signal is next demapped using a bit demapping device 132 of an inverse MPPM-based distribution matcher 131. In some embodiments, the inverse MPPM-based distribution matcher 131 includes a bit mapping device in communication with an array of MPPM decoders 135. The array of decoders 135 is in communication with a switching device 140. An output bit stream is transmitted from the inverse MPPM-based distribution matcher 131. In general, in various embodiments, the output bit stream is the same as, is substantially the same as, or contains the same data as the input bit stream. In some embodiments, the distribution matcher may be fabricated using a first digital ASIC or other electronic device and the inverse distribution matcher may be fabricated using a second digital ASIC or other electronic device. Similarly, the distribution matcher encodes and maps an input bit stream per a modulation scheme and the inverse distribution matcher decodes the modulated bit stream to recreate the input bit stream and output it.

MPPM Based Distribution Matcher Systems, Methods, and Non-Limiting Parameters and Examples In some embodiments, an MPPM-based distribution matcher 10 uses Q-1 parallel MPPM encoders, where Q is the number of amplitude levels in the base constellation. Although, MPPM-based distribution matchers and matching is discussed herein, in various other embodiments the systems and methods disclosed herein also apply to PPM-based distributing matchers and matching. In various embodiments, Q ranges from about 2 to about 8. In various embodiments, the number of amplitude levels is not limited to power of 2s and other powers and amplitude levels may be used without limitation. In many embodiments, 256-QAM corresponds to Q=8.

In some embodiments, a plurality, group, or set of MPPM encoders and decoders are used. In various embodiments, a given plurality, group, or set of MPPM encoders may be connected, arranged, linked or otherwise in communication based on a particular framework or scheme such as a parallel relationship, a linear relationship, other relationships, scenarios, schemes and combinations of all of the foregoing. In various embodiments, a given example $MPPM_q$ encoder implementation may use different configuration parameters $n_q$, $k_q$, q=0 . . . . Q-2. In various embodiments, a given example $MPPM_q$ encoder implementation uses various priority levels. In some embodiments, the lower the index q, the higher the priority. In some other embodiments, the lower the index q, the lower the priority. In some circumstances, different priority or level association schemes may be used for different encoder implementations. Various logic, photonic devices, ASICS, and FPGAs may be used to implement the systems and methods disclosed herein.

In some embodiments, the highest priority encoder $MPPM_0$ may use the full frame length d as its block size. While this configuration is preferred in some embodiments, it is not a requirement. Multiple $MPPM_0$ may blocks fit into the frame length d, subject to $c_0 \times n_0 \leq d$ ($c_0$ is the number of blocks). From the inequality, it is also possible that some time slots within frame length d may be unused.

In some embodiments, as $MPPM_0$ uses $c_0 \times k_0$ time slots for some encoding processes, those time slots may be unavailable for the lower priority MPPM encoders. In various embodiments, allocation of time slots based on a given encoder level may preclude other encoders from using a set of time slots allocated based on a particular priority or level scheme. In some embodiments, block lengths of the lower priority encoders may satisfy the following relationship:

$$c_x \times n_x \leq d - \sum_{y=0}^{x-1} c_y \times k_y$$

In some embodiments, n is number of a time slot. In some embodiments, k is a number of pulses. In some embodiments, y is an index for counter and increment or decrementing summation.

Figure 2:
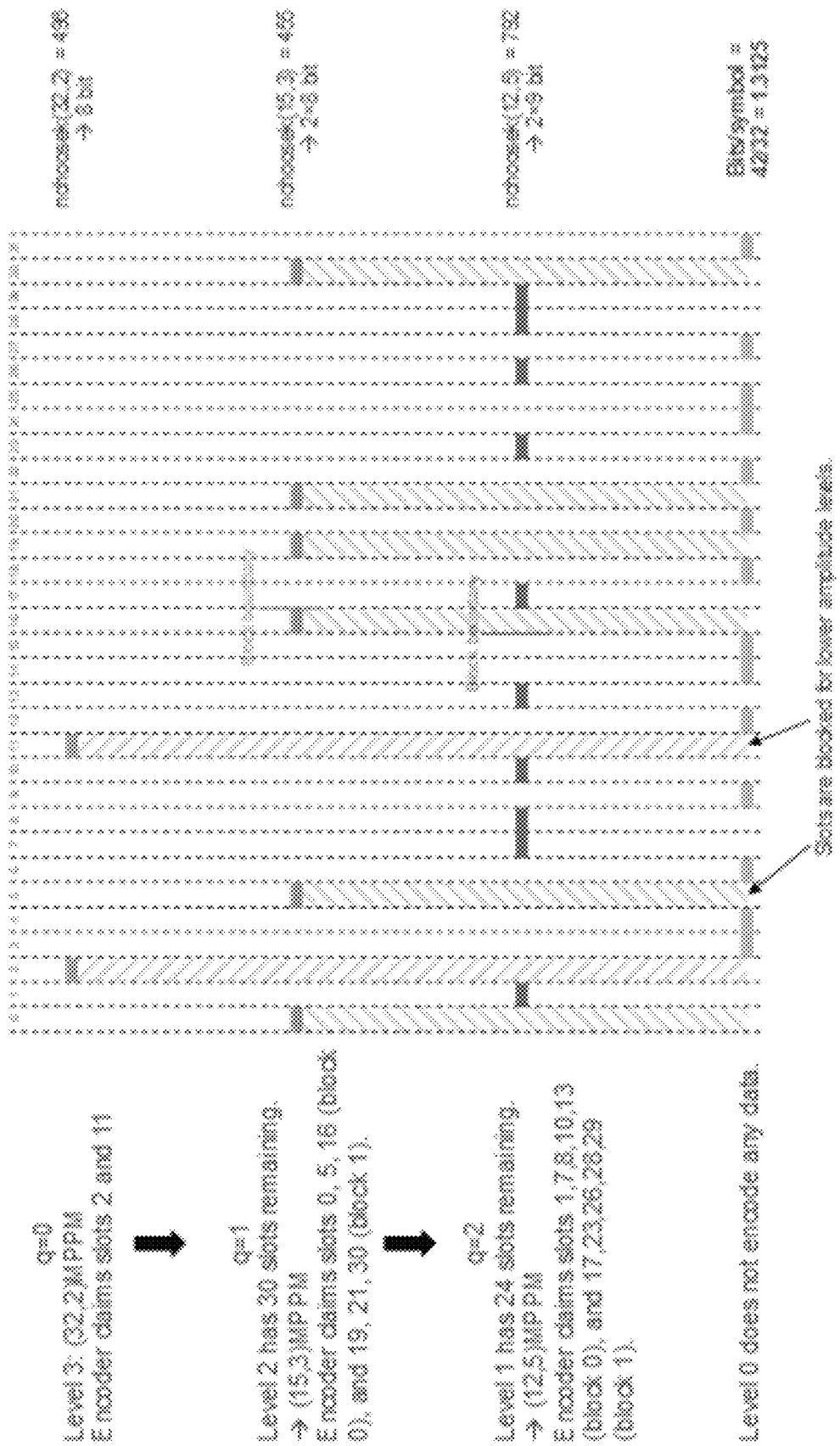
FIG. 2 illustrates a high-level non-limiting example representation of one arrangement of distribution matcher priority features and a distribution output, in accordance with an embodiment of the disclosure.

FIG. 2 shows an example of frame. In some embodiments, a given frame has a frame length d, which may vary over a wide range of values. In FIG. 2, a frame with length d=32 and Q=4 output levels is shown along with process steps associated with a prioritized, listed, ranked, or scored set of levels. The progression of levels is shown from level 3 to level 2 and from level 2 to level 1. This progression is but one implementation and the progression of levels may be arranged in a reverse or such as from level 1 to level 2, and from level 2 to level 3. In other embodiments, different numbers and level progressions may be used. In various embodiments, such as for the highest priority encoders the $$\sum\nolimits_{y=0}^{x-1} c_y \times k_y$$

term of the relationship above may be zero, such that d is the value to which $c_x \times n_x$ are evaluated in the relationship.

In the example embodiment, shown, output level 3 is the highest amplitude level and is assigned the highest priority level q=0. In various embodiments, a multi-level allocation of time slots based on a prioritization of one or more MPPM encoders may results in an output with different data or signal components or pulses arranged in a probabilistic distribution relative to the prioritized levels. For example, in the output frame shown in FIG. 2, the MPPM based distribution matcher creates an output frame with probabilities p(3)=6.25%, p(2)=18.75%, p(1)=31.25%, and p(0)=43.75% for the four output levels, Level 3 (q=0), Level 2 (q=1), Level 1 (q=2), and Level 0. FIG. 2 shows a distribution matcher output with frame length d=32 and four amplitude levels. In FIG. 2, the various bars and boundaries can be specified and controlled by encoders in some embodiments.

As discussed herein, various level/prioritization systems and arrangements of encoders may be used. In some embodiments, encoders are in communication according to a parallel architecture such that outputs form one encoder or details relating to priority or time slot use is provided to one or more encoders operable to perform the distribution matching operations and features disclosed herein. In various embodiments, two or more encoders operate in parallel. In various embodiments, three or more encoders operate in parallel. In various embodiments, four or more encoder operate in parallel. In still other embodiments, the number of encoders range from 1 to about 1024.

Figure 3:
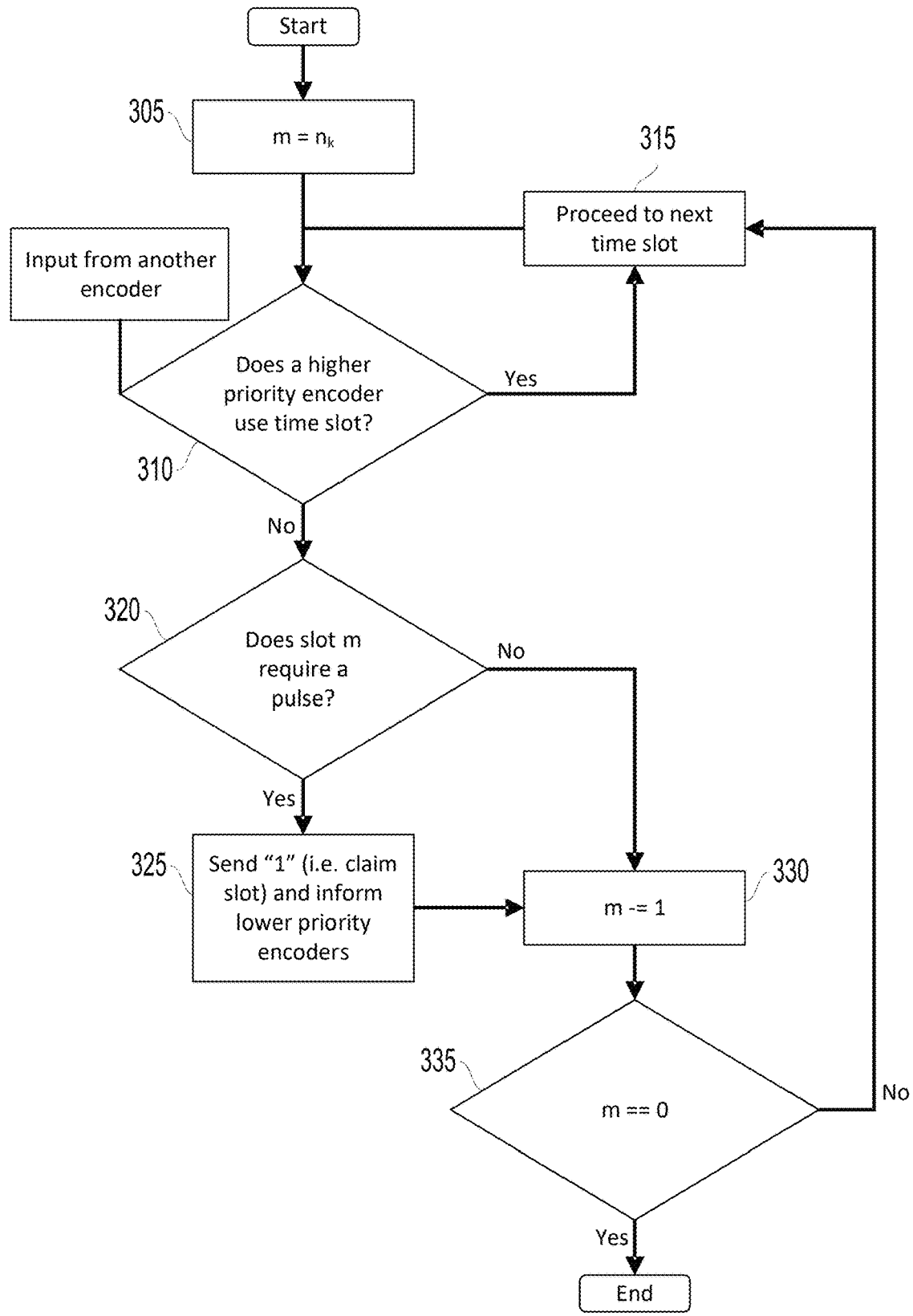
FIG. 3 illustrates a high-level MPPM based distribution matching encoding process, in accordance with an embodiment of the disclosure.

In FIG. 3, an example of an MPPM encoding process is shown. In general, the process flow shown operates to allocate pulses to timeslots. In some embodiments, m is a counter for time slots left or allocated for a given encoder or decoder. The counter m may be used to send or receive parts of an input or output bit stream to arrays of encoders and decoders, respectively. In other embodiments, as shown in FIG. 1, the m values also correspond to the allocation of different components of a given bit stream from a switching device of a matcher such as the distribution matcher 10 and inverse distribution matcher 131. The m values shown as m0, m1, and m2 correspond to the allocation of different bit stream components to or from the encoders and decoders shown in the arrays 20, 135 of FIG. 1. In the case of the highest priority encoder, inputs from other encoders may not be needed. In some embodiments, when a group or plurality of encoders operate together such as in a parallel arrangement or hybrid arrangement, inputs from another encoder can be used to inform the previous allocation of data or one or more pulses to a particular timeslot. In some embodiments, the bit to pulse mapping may be implemented with a variety of options. Some non-limiting examples for such mapping may include look up table (LUT)-based mapping, hybrid or combination mapping or mapping based on binomial coefficients such as through Pascal's triangle or by other methodologies.

Referring to the exemplary embodiment of FIG. 3, the counter m is initialized 305 to a number of time slots $n_k$. A decision 310 is made on whether to continue processing the current time slot m: if a higher priority encoder uses slot m, then the current encoder skips 315 the time slot. Otherwise another decision follows: if slot m requires a pulse, the encoder will output a 1 and inform other encoders 325 and then decrement m 330. If slot m does not require a pulse, m is decremented 325 immediately. Finally, if the number of slots m remaining to be processed is zero 335, the encoder is finished, otherwise the encoder moves to the next time slot 315 and repeats steps 310-335 according to the flow chart. In various embodiments, the switching device of FIG. 1 or another switching device may allocate time slots/components of the input bit stream to the various encoders.

Figure 4A:
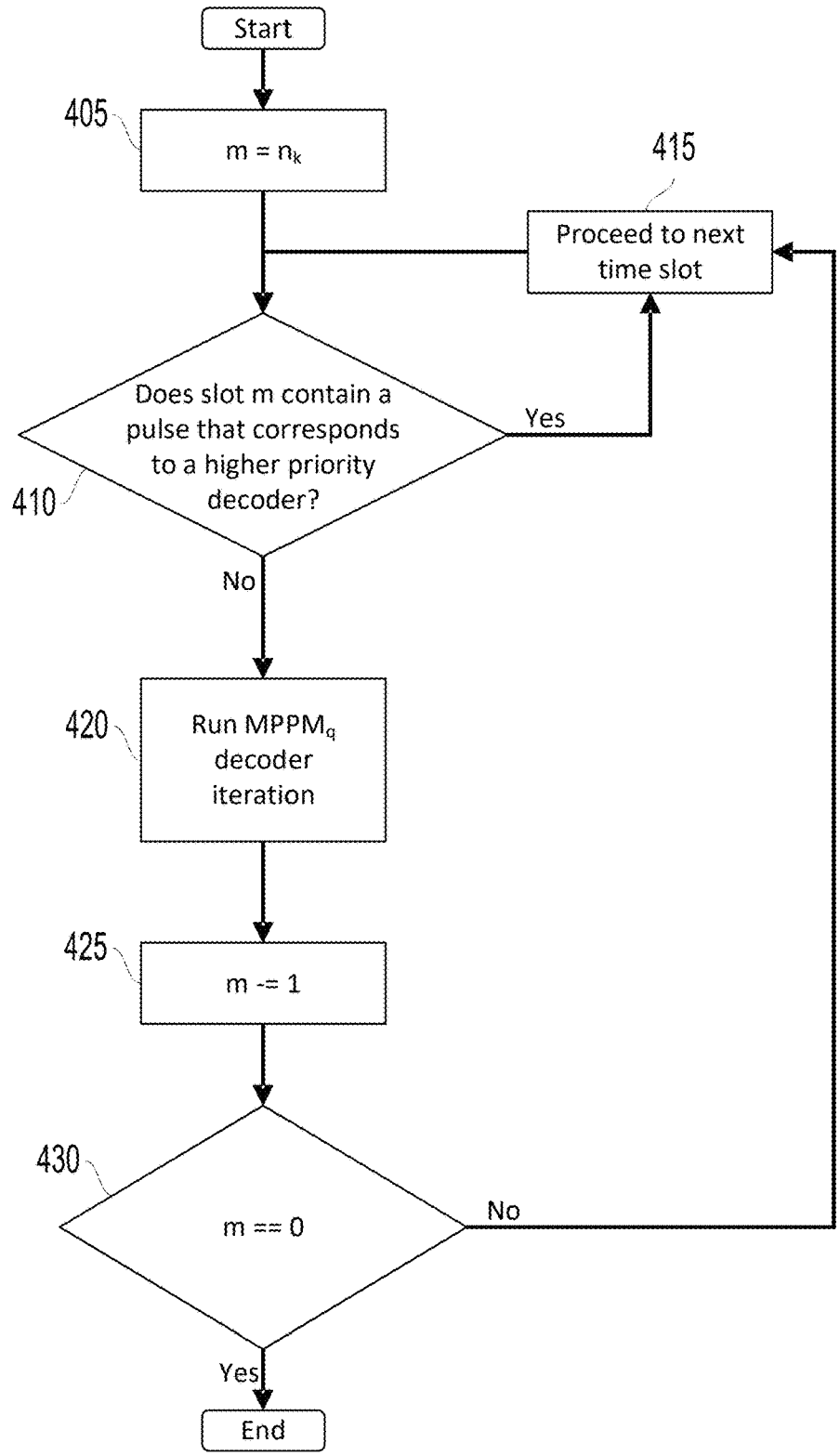
FIG. 4A illustrates an exemplary process to recover an original bit sequence using forward processing, in accordance with an embodiment of the disclosure.
Figure 4B:
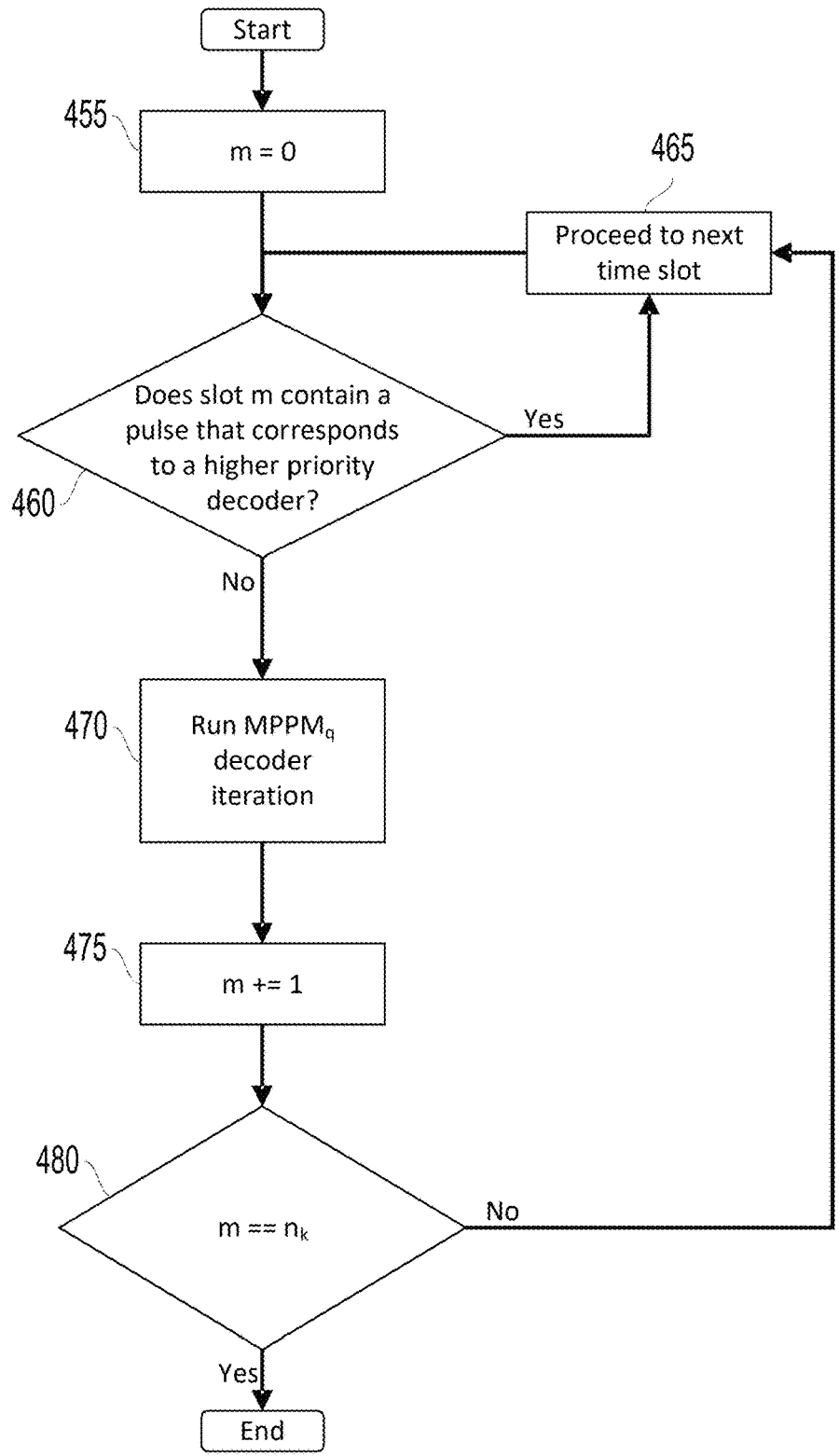
FIG. 4B illustrates an exemplary process to recover an original bit sequence using reverse processing, in accordance with an embodiment of the disclosure.

In some embodiments, for a given set of encoders operable to implement MPPM distribution matching, one or more decoders are operable on the data receiver. In various embodiments, in a given receiver of the pulses/signal, a reverse distribution matcher may be used to recover to original bit sequence from the received symbol sequence. In various embodiments, receiver decoding operations track the transmitter side distribution matcher operations described herein. FIGS. 4A and 4B show example processes for a decoder to recover an original bit sequence. In FIG. 4A, an example process is shown the operates using forward processing. In FIG. 4B, an example process is shown the operates using reverse processing. In some embodiments, a buffer and an associated buffering step may be used as part of a decoding operation. In various embodiments, a forward or reverse process is selected depending on the MPPM decoder implementation that is used.

Refer now to the exemplary embodiment of FIG. 4A, depicting a forward processing routine. A counter m is initialized 405 to a number of time slots $n_k$. A decision 410 is made on whether to continue processing the current time slot m: if time slot m contains a pulse that corresponds to a higher priority decoder, then the current decoder skips 415 the time slot. Otherwise, an $MPPM_q$ decoder iteration process is executed 420 and m is decremented 425. Finally, if the number of slots m remaining to be processed is zero 430, the decoder is finished, otherwise the decoder moves to the next time slot 415 and repeats steps 410-430 according to the flow chart.

Refer now to the exemplary embodiment of FIG. 4B, depicting a reverse processing routine. A counter m is initialized 455 to zero. A decision 460 is made on whether to continue processing the current time slot m: if time slot m contains a pulse that corresponds to a higher priority decoder, then the current decoder skips 465 the time slot. Otherwise, an $MPPM_q$ decoder iteration process is executed 470 and m is incremented 475. Finally, if the number of slots m remaining to be processed is equal to the total number of slots $n_k$ assigned to the decoder 480, the decoder is finished, otherwise the decoder moves to the next time slot 465 and repeats steps 460-480 according to the flow chart.

In various embodiments, the systems and methods may be implemented using various hybrid systems. In some embodiments, a hybrid MPPM-based system that include one or more DM processes disclosed herein along with binary-coding, linear coding, or another coding regime or implementation. In some embodiments, the MPPM based encoding scheme becomes less efficient when the number of pulses within a block is large. In various embodiments, it may be beneficial to replace some of the MPPM encoders with binary encoders or other encoders. Under some hybrid system embodiments with a combination of MPPM and binary or other encoders, a decision to send a pulse may then be based directly on each bit in the input bit sequence. These details may also be specified by a user controlled configuration setting in some embodiments.

Figure 5:
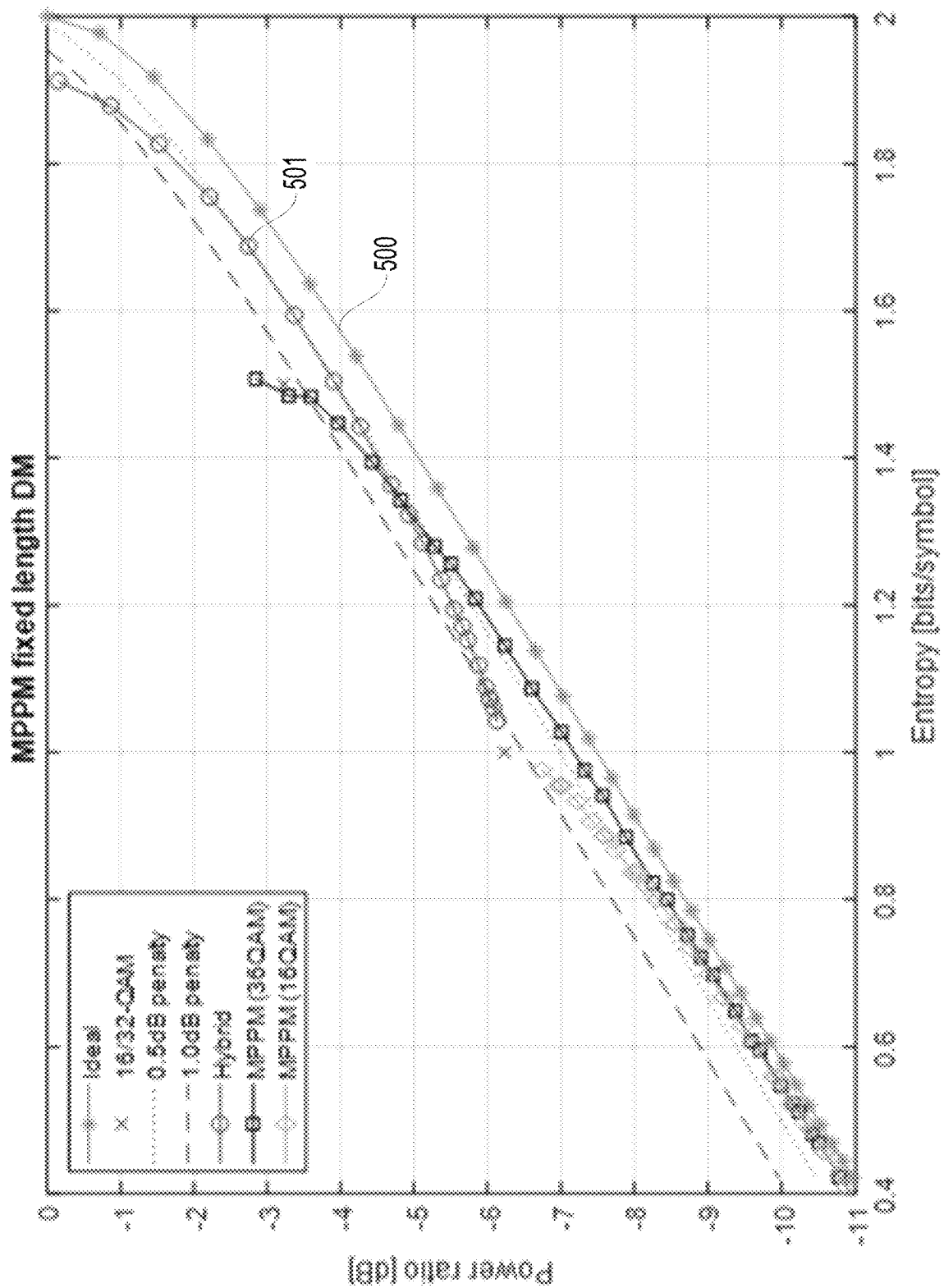
FIG. 5 is a plot of entropy versus power ratio for various distribution matching systems, and other parameters and datasets, in accordance with an embodiment of the disclosure . . .

Various output results for different encoding/multiplexing schemes are shown in FIG. 5. In particular, results for a hybrid scheme shown in FIG. 5. For the example hybrid scheme shown in the plot, the hybrid scheme 501 uses MPPM encoding for the two highest amplitude levels out of the four levels available. In addition, for the example hybrid scheme shown, the third highest amplitude level uses binary coding. Other combinations of encoder types and priority schemes may be used in various embodiments.

Some of the details of FIG. 5 shows the achievable power ratio relative to standard 64-QAM with different MPPM based DM implementations with frame length d=660 and binomial coefficients <248. In some embodiments, the gap to the ideal performance 500 is less than about 0.5 dB up to an entropy level of about 1.75 bits/symbol.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

Embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

What is claimed is:

1. A constellation shaping system comprising:
    a plurality of encoders, wherein one or more of the plurality of encoders is associated with a priority level according to a configuration,
    wherein a pulse is allocated to a time slot, using an encoder based on priority level of the encoder,
    wherein output time slot allocation information is provided to a second encoder from a first encoder,
    wherein the first encoder has a first priority level and the second encoder has a second priority level.

2. The system of claim 1 wherein the plurality of encoders are configured to operate in parallel.

3. The system of claim 1 wherein Q is cardinality of amplitude levels in base constellation.

4. The system of claim 1 wherein the one or more of the plurality of encoders is a binary encoder.

5. The system of claim 3 wherein Q ranges from 2 to 12.

6. The system of claim 1 further comprising a distribution matcher comprising the plurality of encoders; a bit stream input; and a switch in communication with the bit stream input and the plurality of encoders.

7. The system of claim 6 wherein the switch allocates one or more bits from the input bit streams to different slots, wherein each slot is in communication with an encoder of the plurality of encoders.

8. The system of claim 7 wherein the distribution matcher further comprises a bit mapping device, wherein the bit mapping device receives outputs from the plurality of encoders.

9. The system of claim 8 further comprising a forward error correction encoder, the forward error correction encoder in communication with the bit mapping device.

10. The system of claim 9 further comprising the mapping device, wherein the mapping device maps output signals from the forward error correction encoder according to a modulation scheme.

11. The system of claim 10 wherein the modulation scheme is a pulse amplitude modulation (PAM) or quadrature amplitude modulation (QAM).

12. The system of claim 6 further comprising an inverse distribution matcher in communication with the distribution matcher.

13. The system of claim 1 wherein the plurality of encoders are a plurality of multipulse pulse-position modulation (MPPM) encoders.

14. A constellation shaping system comprising:
a first encoder having a first priority level; and
a second encoder having a second priority level,
wherein a pulse is allocated to a time slot, using the first encoder or the second encoder based on a priority level of one of the first encoder or the second encoder,
wherein output time slot allocation information is exchanged between the first encoder and the second encoder.

15. The system of claim 14 further comprising a distribution matcher comprising the first encoder and the second encoder, a bit stream input; and a switch in communication with the bit stream input and the first encoder and the second encoder.

16. The system of claim 15 wherein the switch allocates one or more bits from the input bit streams to different slots, wherein each slot is in communication with either the first encoder or the second encoder.

17. The system of claim 16 further comprising a bit mapping device that receives outputs from the first encoder, wherein the first encoder is a MPPM encoder.

18. A constellation shaping method comprising:
setting a first priority level of a first encoder;
setting a second priority level of a second encoder;
allocating a pulse to a time slot based on a priority level of one of the first encoder or the second encoder; and
exchanging output time slot allocation information between the first encoder and the second encoder.

19. The method of claim 18, wherein the first encoder is a MPPM encoder and the second encoder is a MPPM encoder.

* * * * *